April 26, 1966 R. I. ROTH ETAL 3,248,704

ASSOCIATIVE MEMORY SYSTEM

Filed June 28, 1961 10 Sheets-Sheet 1

INVENTORS
ROBERT I. ROTH
HAROLD FLEISHER

BY Joe L. Koerber
ATTORNEY

ASSOCIATIVE MEMORY SYSTEM

Filed June 28, 1961 10 Sheets-Sheet 2

April 26, 1966 R. I. ROTH ETAL 3,248,704

ASSOCIATIVE MEMORY SYSTEM

Filed June 28, 1961 10 Sheets-Sheet 4

ASSOCIATIVE MEMORY SYSTEM

Filed June 28, 1961

10 Sheets-Sheet 9

United States Patent Office 3,248,704
Patented Apr. 26, 1966

3,248,704

ASSOCIATIVE MEMORY SYSTEM

Robert I. Roth, Briarcliff Manor, and Harold Fleisher, Poughkeepsie, N.Y., assignors to International Business Machines Corporation, New York, N.Y., a corporation of New York Filed June 28, 1961, Ser. 120,213
9 Claims. (Cl. 340—172.5)

The present invention relates to an associative memory system and more particularly to circuitry for reading words selectively from memory.

As associative memory system may be described generally as a system including word memory and means for interrogating the memory in accordance with selective data requirements. When this interrogation or association indicates that the interrogated portions of one or more words in the memory matches the selective data requirements, it is usually desired to extract the entire matching word or parts thereof from memory.

A usual mode of operation is to interrogate a multiword memory in accordance with association data and to register an indication of those words which match the association data. Thereafter, the matching words or portions thereof are to be read out to utilization circuits. Generally the words are read out serially by word and either serially or parallel by bit.

One shortcoming in some prior art devices is the necessity for interrogating the match indicating circuits as many times as there are words in the memory. Using that mode of readout, if only one word in a one hundred word memory is to be read out, one hundred read out cycles are required. The present invention accomplishes the read out of the one word in a single cycle, or the read out of ten matching words in ten cycles.

Accordingly, a primary object of this invention is to provide an improved circuit for extracting associated words from memory.

A further object of this invention is to provide an improved read out circuit operated in accordance with stored indications of matching and mismatching words.

Another object of this invention is to provide read out circuitry which reads selected words from memory serially by word and parallel by bit.

Yet another object of this invention is to provide read out circuitry which reads matching words from memory in a predetermined order.

Another object of this invention is to provide read out circuitry which reads a selected multi-bit word from memory parallel by bit.

A still further object of this invention is to provide read out circuitry which provides an indication when the last selected word has been read out.

Another object is to read $n$ matching words serially from memory in $n$ read cycles.

The foregoing and other objects, features and advantages of the invention will be apparent from the following more particular description of a preferred embodiment of the invention, as illustrated in the accompanying drawings.

FIGS. 2*a*–2*h* comprise a wiring schematic of the system.

Figure 3A:
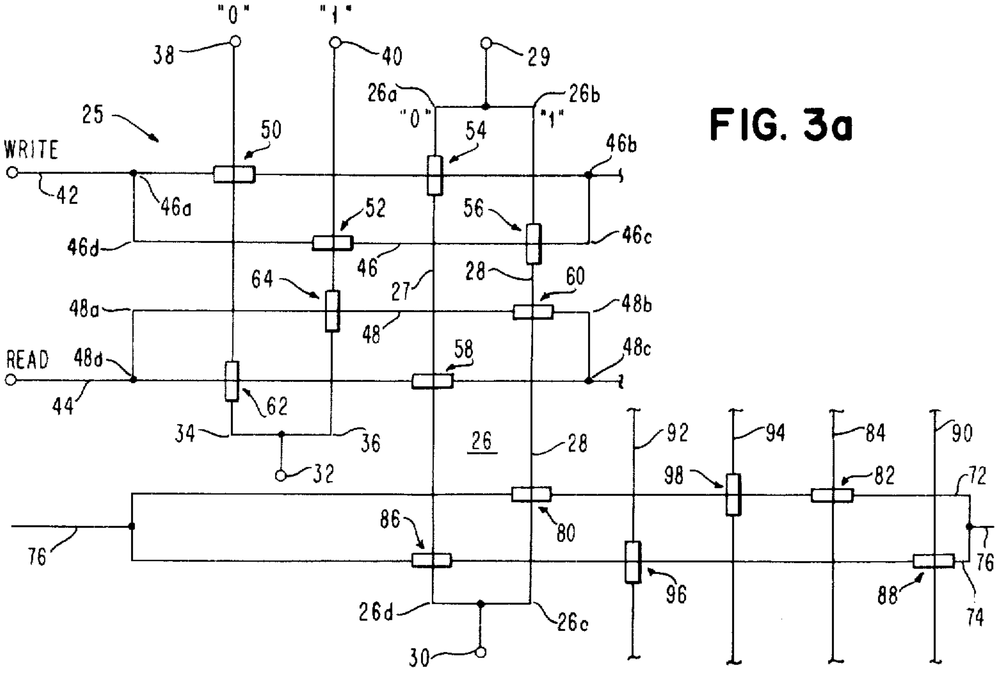

FIG. 3*a* is a circuit schematic of the basic memory register.

Figure 3B:
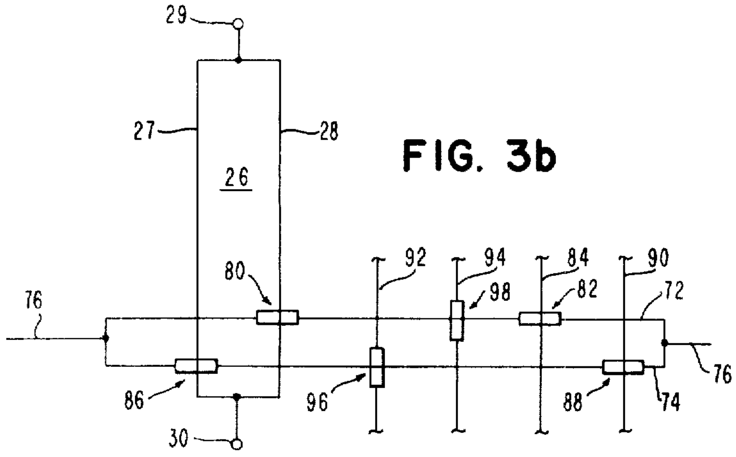

FIG. 3*b* is a diagrammatic representation of the circuit of FIG. 3*a*.

Figure 4A:
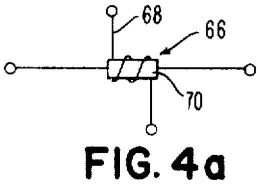

FIG. 4*a* is a schematic of a cryogenic gate element.

Figure 4B:
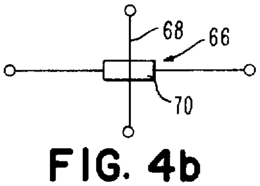

FIG. 4*b* is a diagrammatic representation of the element in FIG. 4*a*.

Figure 5:
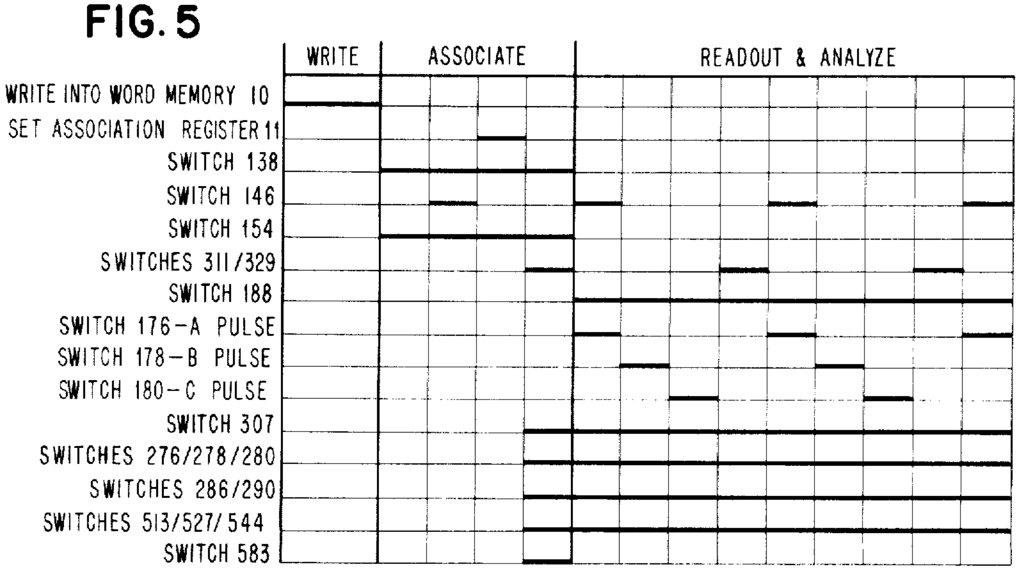

FIG. 5 is a timing chart.

Figure 1:
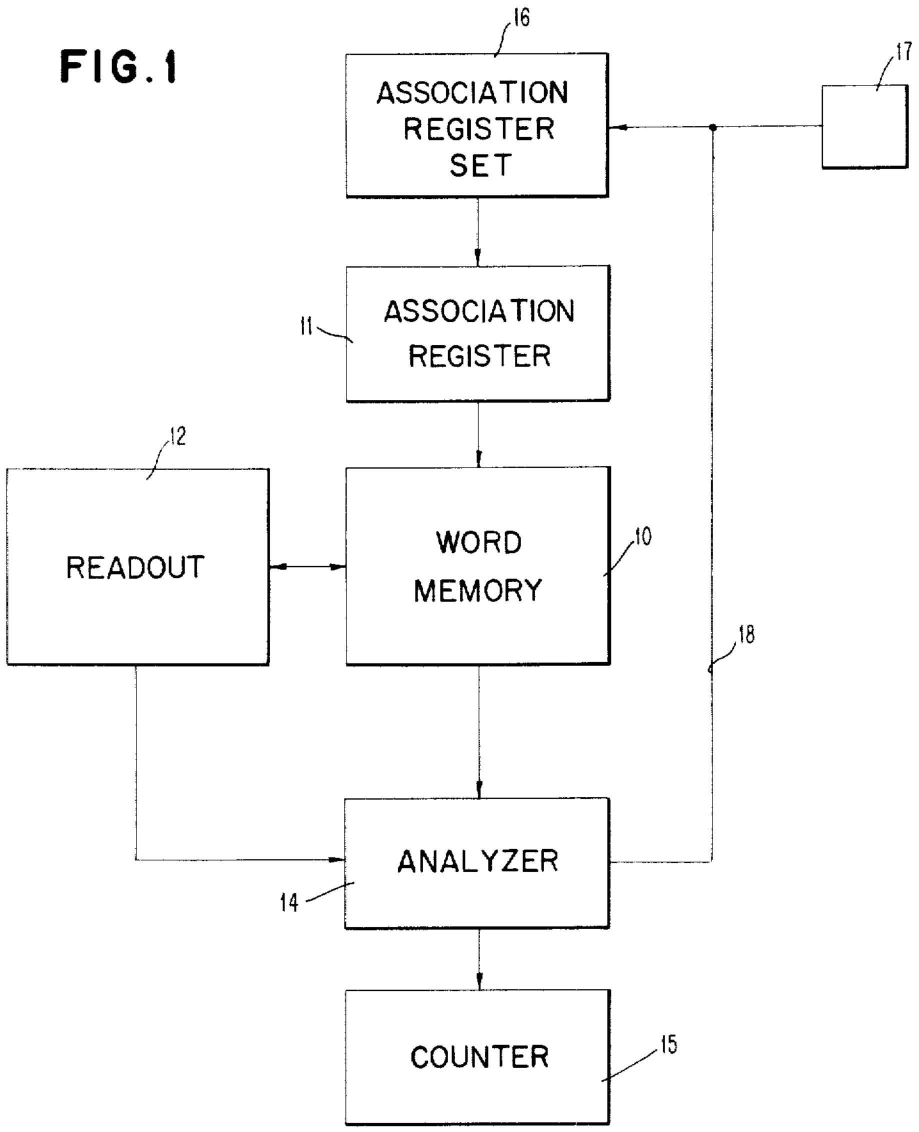
FIG. 1 is a block representation of the circuit.
Figure 2:
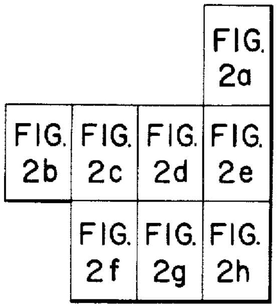
FIG. 2 illustrates the arrangement of FIGS. 2*a*–2*h*.

The invention is disclosed, as illustrated in FIG. 1, in a cryogenic embodiment of an associative memory system, comprising a word memory 10, an association register 11, a read out circuit 12, analyzing circuit 14, counter 15, association register set unit 16, a unit 17 for entering an initial count in the unit 16 and a feedback circuit 18 for controlling a subsequent operation of the system.

In a system of this type any desired data may be stored in the word memory and may be located therein by association with data placed in the association register. The association register may be associated with the word memory in such a manner that the entire contents of the words in memory are compared with data in the association register or where only a selected field of the words in memory are compared with data in a corresponding portion of the association register.

The data in the association register are compared simultaneously with all words in the memory and indications of which words in memory match the association data are stored in the read out unit. Thereafter, under control of the read out unit, the words in memory which match the association data are read out, a word at a time, into the analyzer unit.

In the analyzer unit, selected criteria of the data are analyzed to determine the presence or absence of these criteria in the words which responded to the association operation. The responses may be recorded in the counter unit.

The analyzer unit is so organized that, if the selected criteria are found not to be present in the associated words, a feedback signal to the association register set unit changes the data in the association register to initiate an association search of a different scope.

The word memory, as illustrated in more detail in FIGS. 2*a*–2*h*, comprises four words designated 1, 2, 3 and 4. Each word of the illustrated memory comprises eleven bistable cryogenic storage cells or registers representing, in one stable state, a binary 1 and, in the other stable state, a binary 0.

Each register is designated by the word number plus a bit position suffix, for example, word 1 registers are resignated 1–1, 1–2, etc. While 11 bit words are illustrated, it will be understood that the binary word may comprise a large number of bits. Similarly, the word storage generally would comprise a large number of words, but, for simplicity of illustration is herein shown as having only four.

The present invention is also disclosed in copending application Serial Number 120,212 filed June 28, 1961 and assigned to the assignee of this invention.

In order to simplify the system diagram, not all details of the individual registers are shown in FIGS. 2*a*–2*h*, but are illustrated in detail in FIG. 3*a*. It will be understood that each register in word memory 10 is identical to the one shown in FIGURE 3*a*.

Referring next to FIG. 3*a*, a memory cell or register 25 is illustrated. The register 25 includes a storage loop 26 which is defined by the points 26*a*, 26*b*, 26*c* and 26*d*. The leg of the loop defined by points 26*a*, 26*d* is hereafter referred to as line 27 and that leg defined by the points 26*b*, 26*c* is referred to as line 28. Current is supplied to the storage loop 26 through a terminal 29 at the top and exits through a terminal 30 at the bottom. Direct current applied to the terminal 29 remains on as long as the register 25 is in operation.

During a read operation current is applied to a terminal 32 and flows along one of the vertical lines 34 or 36. Current on the line 36 represents a binary one. Current on the line 34 represents a binary zero. Current on the line 34 or 36 is supplied to a corresponding terminal 38 or 40 which may be connected to a load device (not shown). During a write operation, current is supplied to one of the vertical lines 34 or 36 by an input device (not shown) which may be connected to terminals 38 and 40.

Register 25 has a write line 42 and a read line 44. The write line 42 includes a control loop 46, and the read line 44 includes a sense loop 48. Each of the foregoing loops is defined by points *a*, *b*, *c* and *d* associated with the loop number.

The control loop 46 includes cryotrons 50 and 52. The storage loop 26 includes cryotrons 54 and 56. The sense loop 48 includes cryotrons 58 and 60. The line 34 includes a cryotron 62 and the line 36 includes a cryotron 64.

Referring to FIGURE 4*a*, a cryotron 66 is illustrated as having a control winding 68 disposed about the cryotron gate element 70. While this cryotron is represented as a conventional wire wound cryotron, it is to be understood that other types of cryotrons may be used. The circuit schematic of cryotron 66 in FIG. 4*a* is depicted in FIG. 4*b* in a simplified form. The reference numerals employed in FIG. 4*a* are used in FIGURE 4*b* to designate corresponding parts. The simplified showing of FIG. 4*b* is employed in FIGS 2*a*–2*h*. FIG. 3*a* and FIG. 3*b* to represent a cryotron such as schematically illustrated in FIG. 4*a*.

The circuits of this invention are operated at low temperatures such as by immersion in liquid helium. Current in the control winding is employed to create a magnetic field which exceeds the critical field of the cryotron gate to drive the cryotron resistive. When no current flows in the control winding of the cryotron, the gate element is superconductive.

Information from an external device may be written into the register 25 or information stored in the register may be read to an external device. To illustrate a writing operation, assume that the binary bit 1 is to be written in register 25. First, the register is placed in the operative condition by applying direct current to terminal 29. This current remains on as long as the register remains in operation. Next, an information signal is supplied to the appropriate vertical line 36. To store a binary 0 bit, current would be applied to line 34. Only one of the two lines is energized at any one time.

A current is applied next to the write line 42. Current on the line 36 drives the gate of the cryotron 52 resistive. Consequently, current on the write line 42 is diverted from that portion of the control loop 46 defined by the points *a*, *d*, *c* and *b*, to that portion of the loop defined by the points 46*a* and 46*b*. Current flowing in this leg of the loop drives the gate of cryotron 54 resistive whereby current from the terminal 29 is diverted through the line 28. Current flowing in the line 28 is arbitrarily designated as representing a binary 1. Current flowing in the line 27 is arbitrarily designated as representing a binary 0. Thus a binary 1 is written in the register 25. At this point the current on the write line 42 may be terminated and the information signal represented by the current applied to the terminal 40 may be terminated.

A binary 0 is stored by applying a current to line 34 instead of to line 36 driving the gate of cryotron 50 resistive whereby current in the loop 46 is diverted through that portion of the loop defined by the points 46*a*, 46*d*, 46*c* and 46*b*. Current in this leg of the loop 46 drives the gate of cryotron 56 resistive whereby current from the terminal 29 is diverted through the line 27.

To illustrate a read operation, assume that a binary 1 bit stored in register 25 is to be read out. Current applied to the terminal 29 during the write operation remains on. Current is applied to the terminal 32 and to the read line 44. It is permissible to energize the terminal 32 and the read line 44 simultaneously.

The current in the line 28 representing the stored binary 1 drives the gate of the cryotron 60 resistive, whereby current on the read line 44 is diverted through that portion of the control loop 48 defined by the points 48*d* and 48*c*. Current in this portion of the control loop drives the gate of the cryotron 62 resistive and diverts current from the terminal 32 to the vertical line 36. The binary 1 read from register 25 is thus supplied to a load device via the terminal 40.

At this point the current on the read line 44 and the terminal 32 may be terminated. The direct current signal applied to the terminal 29 is maintained. If a binary 0 is in the register 25 when the currents are applied to terminals 32 and 44, the gate of cryotron 58 is resistive whereby the current applied to terminal 44 is diverted through that portion of the loop 48 defined by the points 48*d*, 48*a*, 48*b* and 48*c*, thus driving the gate of cryotron 64 resistive and diverting the current applied to terminal 32 through the binary 0 line 34 to the terminal 38.

For a more detailed description of this register, reference may be made to U.S. Patent 3,170,145, issued February 16, 1965 and assigned to the assignee of this invention.

Referring again to FIG. 3*a*, the register disclosed in U.S. Patent 3,170,145 and described hereinbefore is modified by the addition of a read loop comprising lines 72 and 74 connected in parallel in a line 76. The line 72 includes cryotron gates 80 and 82 having as control windings line 28 of storage loop 26 and a line 84 respectively. The line 74 includes cryotron gates 86 and 88 having as control windings the line 27 of storage loop 26 and a line 90 respectively. The lines 84 and 90 comprise a part of the association circuit described hereinafter.

A pair of lines 92 and 94 comprise a pair of readout lines described hereinafter. Line 92 includes a cryotron gate 96 having the line 74 as a control winding. Line 94 includes a cryotron gate 98 having the line 72 as a control winding.

The circuit of FIG. 3*a* is shown diagrammatically in FIG. 3*b* omitting however, the read and write portions thereof. The register 25 does not per se comprise a part of the present invention. Therefore, the diagrammatic representation of FIG. 3*b* is used in FIGS. 2*c*, 2*d* and 2*e*.

OPERATION

Assume that data are already stored in words 1, 2, 3 and 4 of word memory 10 as described hereinbefore with reference to FIG. 3*a*.

Assume further that each word comprises 11 registers. Since only 6 registers are shown in FIGS. 2*c*, 2*d* and 2*e*, the 5 registers not shown are represented as omitted at the break line 100. To represent age in binary code in excess of 100 years, 7 registers are required. Assume that registers 1 and 2 of each word comprise the two low order registers of a 7 register age field. Registers 3, 4, 5, 6 and 7 representing the remainder of the age field are omitted, but will be appropriately referred to in the specification by word and bit numbers.

Assume that each word represents data concerning an individual. Assume also that registers 8, 9, 10 and 11 each contain data relating to the medical history of the individuals. Assume further that bit position 8 represents high blood pressure, bit position 9 represents heart disorder, bit position 10 represents cancer, and bit position 11 represents diabetes. Other fields or bit positions may be provided for other data but those illustrated will be sufficient to demonstrate the system.

Assume that, in a particular study, it is desirable to find the number of people of various ages who have a history of high blood pressure, heart disorder, cancer and diabetes, or some combination of these four. The age field, bit positions 1–7, comprise the tag which will be interrogated for all persons of a particular age, for example, 23. When all words including the age 23 in the tag field have been identified, the field comprising positions 8, 9, 10 and 11 of each identified word will be interrogated to determine whether the person associated with that word had the particular disorder. The binary 1 is arbitrarily designated to represent the presence of the disorder in the record and the binary 0 to represent its absence.

In the example to be described in detail, it is assumed that the following binary bits are stored from left to right in the four memory words as follows:

| Bit Position | 11 | 10 | 9 | 8 | 7 | 6 | 5 | 4 | 3 | 2 | 1 |
|---|---|---|---|---|---|---|---|---|---|---|---|
| Word 1 | 1 | 1 | 0 | 1 | 0 | 0 | 1 | 0 | 1 | 1 | 1 |
| Word 2 | 1 | 0 | 0 | 1 | 0 | 0 | 1 | 1 | 0 | 0 | 0 |
| Word 3 | 1 | 0 | 0 | 1 | 0 | 0 | 1 | 0 | 1 | 1 | 1 |
| Word 4 | 1 | 0 | 1 | 1 | 0 | 0 | 1 | 1 | 0 | 0 | 1 |

Figure 2A:
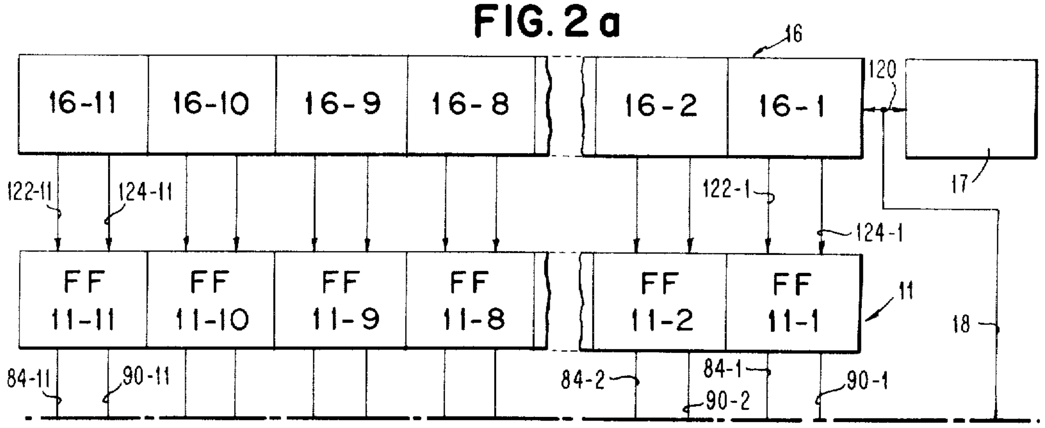

Referring to FIG. 2*a*, the association register set unit 16 is a binary counter which responds to successive input signals to its low order stage 16–1 on a line 120 and which provides parallel binary outputs from all orders on binary 1 lines 122 and binary 0 lines 124. This type of set unit is particularly useful where the interrogation tag is to be a numerical value such as age and where it may be desirable to interrogate the memory for successive age tags. The set unit 16 may be initially set by any conventional pulse generating device, for example a key board, herein represented schematically by the block designated 17. The set unit 16 may also be advanced incrementally by signals on the line 18 in a manner to be described hereinafter.

An additional requirement of the unit 16 is that the stages 16–1 through 16–11 be capable of operating as counters in groups of less than the total number. For example, when the tag to be interrogated comprises the bit position 1–7, as in the present example, the corresponding orders of the set unit 16 must operate as a 7 order binary counter and the remaining orders are disconnected so as to provide current on neither of the corresponding lines 122 or 124. For the present example, it is assumed that orders 16–8 through 16–11 are so disconnected and current does not appear on either the corresponding lines 122–8 through 122–11 nor 124–8 through 124–11.

The association register 11, FIGS. 1 and 2*a*, consists of a plurality of flip-flops designated 11–1 through 11–11 corresponding to the counter stages 16–1 through 16–11. The flip-flops are set to their binary 1 or binary 0 states in accordance with the outputs of the corresponding counter orders on binary 1 lines 122 and binary 0 lines 124. The outputs of the association register 11 are fed to the word memory 10 via binary 1 lines 84–1 through 84–11 and binary 0 lines 90–1 through 90–11.

In accordance with the value 23 in the association register, currents on the binary 1 lines 84–5, 84–3, 84–2 and 84–1 render corresponding cryotrons 82 in words 1, 2, 3 and 4 resistive. It is noted that the designation 82, first used with reference to FIGURE 3*a*, is used in all bit positions of all words. Each cryotron 82 has a suffix 1, 2, 3 or 4 depending upon the particular word 1, 2, 3, or 4 in which it occurs. The currents on the binary 0 lines 90, in accordance with the number 23 in the association register, render corresponding cryotrons 88 in words 1, 2, 3 and 4 resistive. Suffixes 1, 2, 3 and 4 are used to further identify cryotrons 88 in accordance with the word in which they occur.

The memory cells 25 comprising each bit of storage in the four words contain the binary bits 1 or 0 as set forth in the chart hereinbefore. Also, as previously described, storage of a binary 1 is manifested by the establishment of a current in the right hand leg of a loop 26 of a memory cell and the consequent resistive state of the corresponding cryotron 80. The storage of the binary 0 is manifested by current in the left hand leg of a loop 26 of the corresponding memory cell and the consequent resistive state of the corresponding cryotron 86.

TAG ASSOCIATION

Referring to FIGURE 2*e*, a switch 138 may be closed to pass current from a source represented by a terminal 140 through a line 142, which comprises the control winding, for rendering cryotrons 144–1, 144–2, 144–3 and 144–4 resistive. A switch 146 may be closed to pass current from a source represented by terminal 148, through control winding 150 to ground, thereby rendering cryotrons 152–1, 152–2, 152–3 and 152–4 resistive.

Current is on at the terminals 29 thus rendering resistive the cryotrons 80 and 86 in accordance with the stored binary values. Current also is on at terminals 156 and 140. To commence the association phase of the operation, the switches 154 are closed to apply read currents simultaneously to all read lines 153–1 to 153–4. Coincidently therewith, the switch 138 is closed to hold cryotron 144 resistive. After the switches 154 and the switch 138 have been closed, the switch 146 is closed to render the cryotrons 152 resistive, thus forcing the current on the lines 153 to flow through the corresponding lines 76. Having thus set the currents into the lines 76, the association currents may now be applied to lines 84 and 90. The desired age, in this instance 23, (0010111 in binary form), is set into the association register 11. This places currents on the binary 1 lines 84–5, 84–3, 84–2 and 84–1 and on the binary 0 lines 90–7, 90–6 and 90–4.

In the case of a match condition between the association current on a line 84 or 90 and the value stored in the corresponding loop 26, the current will remain on the line 76. However, in the case of a mismatch, the current will be switched from the line 76 to the corresponding line 156.

The paths followed through the lines 76, 72, 74 and 156 in the various words and word bit positions depend upon the binary contents of the memory as well as the binary contents of the association register.

Referring to word 1, the current applied to line 150 renders cryotrons 152–1 resistive and forces the read current on line 153–1 to flow in line 76–1 rather than through cryotron 152–1 into line 156–1. Due to the storage of a binary 1 in word bit position 1—1, cryotron 80–1 in that position is resistive. Due to the current in binary 1 line 84–1, cryotron 82–1 is resistive. Thus there is a match condition between the cell contents and the interrogation data. Therefore, due to the resistive state of cryotrons 80–1 and 82–1, the read current applied to line 153–1 and diverted to line 76–1 cannot flow through the line 72–1 but must follow through line 74–1.

Bit position 1–2 also stores a binary 1 and therefore cryotron 80–1 in that bit position is resistive and 86–1 is superconductive. Due to current on the binary 1 line 84–2, cryotron 82–1 is resistive. Therefore, the current on line 76–1 flows through line 74–1 of bit position 2.

In accordance with the specified example, the bit position 1–3 stores a binary 1 and the corresponding association register also stores a binary 1. Thus, as in the case of bit positions 1—1 and 1–2, the current flows in corresponding lines 74–1.

The bit position 1–4 stores a binary 0 and, therefore cryotron 86–1 of this bit position is resistive. Current on the binary 0 line 90–4 renders cryotron 88–1 resistive and current from bit position 1–3 on line 76–1 is diverted through the line 72–1.

The bit position 1–5 stores a binary 1 and the binary 1 current on the line 84–5 renders the corresponding cryotron 82–1 resistive whereby the current flows in line 74–1.

Bit positions 1–6 and 1–7 store binary zeros which match the interrogation data. Thus, current flows through lines 72–1 of these bit positions.

As described hereinbefore, there is current on neither the line 84 nor the line 90 of bit positions 8 through 11. Therefore the current from line 76–1 of bit positions 1–7 flows through the lines 72–1 and 74–1 of the bit positions 8 through 11 in accordance with the resistive states of the cryotrons 86–1 and 80–1 only. Since the bit positions 8 through 11 of word 1 store the binary digits 1011 respectively, the current flows through line 72–1 of bit position 9 and through lines 74–1 of bit positions 8, 10 and 11.

Thus, the tag in bit positions 1 to 7 of word 1 corresponds to the interrogation value set in the association register 11 and the interrogation current put in on line 153–1 emerges from the word memory unit on the line 76–1. If a mismatch between the bit position contents and the association register had been detected in any one of the bit positions 1 to 7, the current would have been blocked in a pair of lines 72 and the line 74 by the resistive states of cryotrons 80 and 86. Since, as indicated in the timing chart, FIG. 5, the switch 146 is closed only momentarily to divert the current to the lines 76, the blocked current would have been diverted back to the line 156–1.

Bit positions 1 to 7 of word 2 store the binary value 24 and therefore do not match the interrogation value 23 in the association register 11. The current applied to line 153–2 therefore is diverted to the line 156–2 indicating a mismatch.

Bit positions 1 to 7 of word 3 store the binary value 23 and the current applied to line 153–3 emerges from the word memory 10 on the line 76–3 indicating a match.

Bit positions 1 to 7 of word 4 store the value 25 and the current applied to the line 153–4 emerges on the line 156–4 indicating a mismatch.

Thus far a matching condition has been established between the settings of the association register 11 and the data stored in words 1 and 3, this matching condition being manifested by currents on lines 76–1 and 76–3. A mismatch condition has been established between the register 11 contents and the information in words 2 and 4 and is manifested by current on lines 156–2 and 156–4. This is the end of the comparison or association operation at which point the read pulses on lines 153–1, 153–2, 153–3 and 153–4 are terminated by opening switches 154. Switch 138 is opened to remove the inhibiting current from the cryotrons 144–1, 144–2, 144–3 and 144–4.

This type of associative memory is shown and described in copending application Serial Number 119,719 filed June 26, 1961 and assigned to the assignee of the present invention.

READ OUT CIRCUIT

Figure 2B:
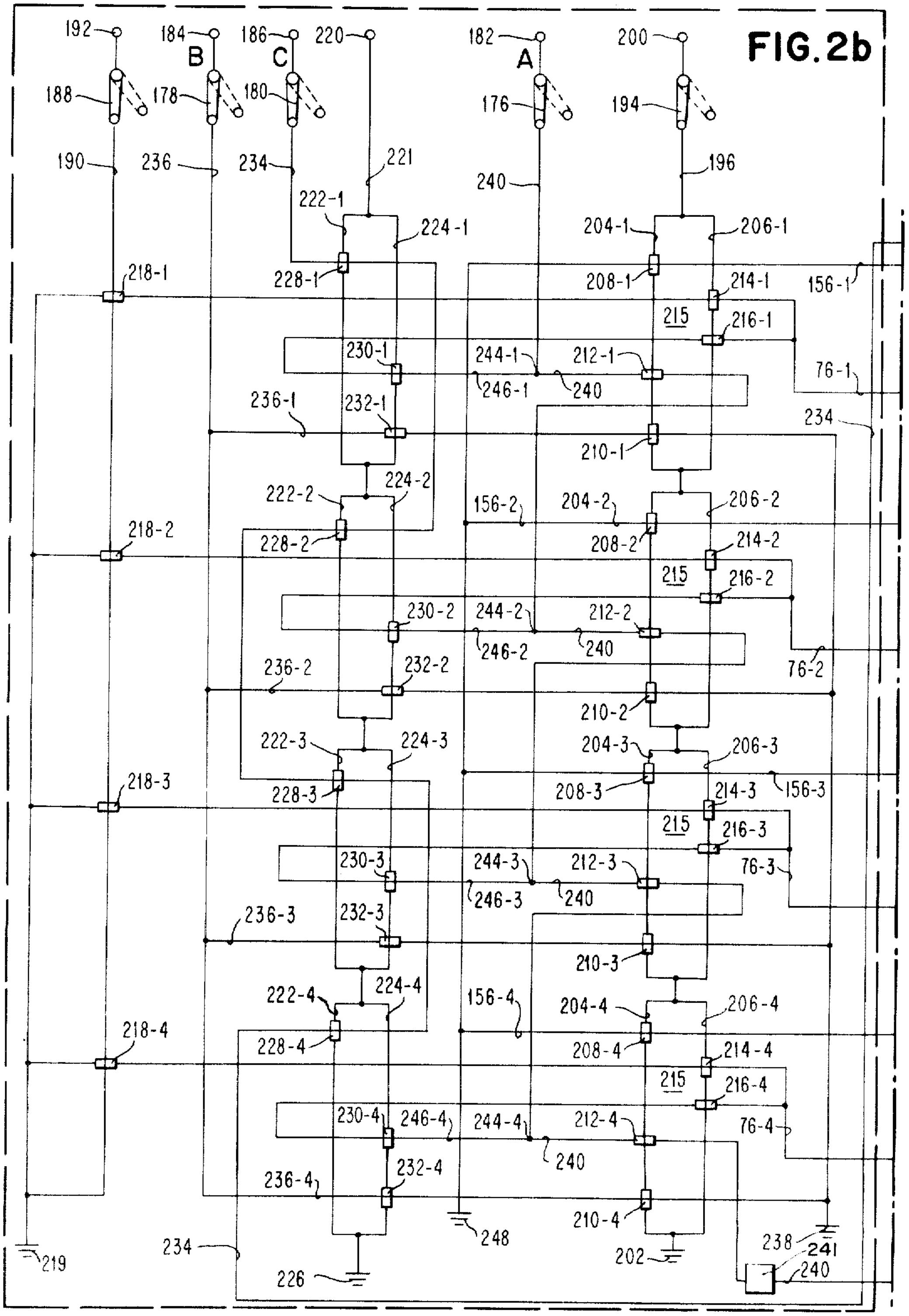
Figure 2C:
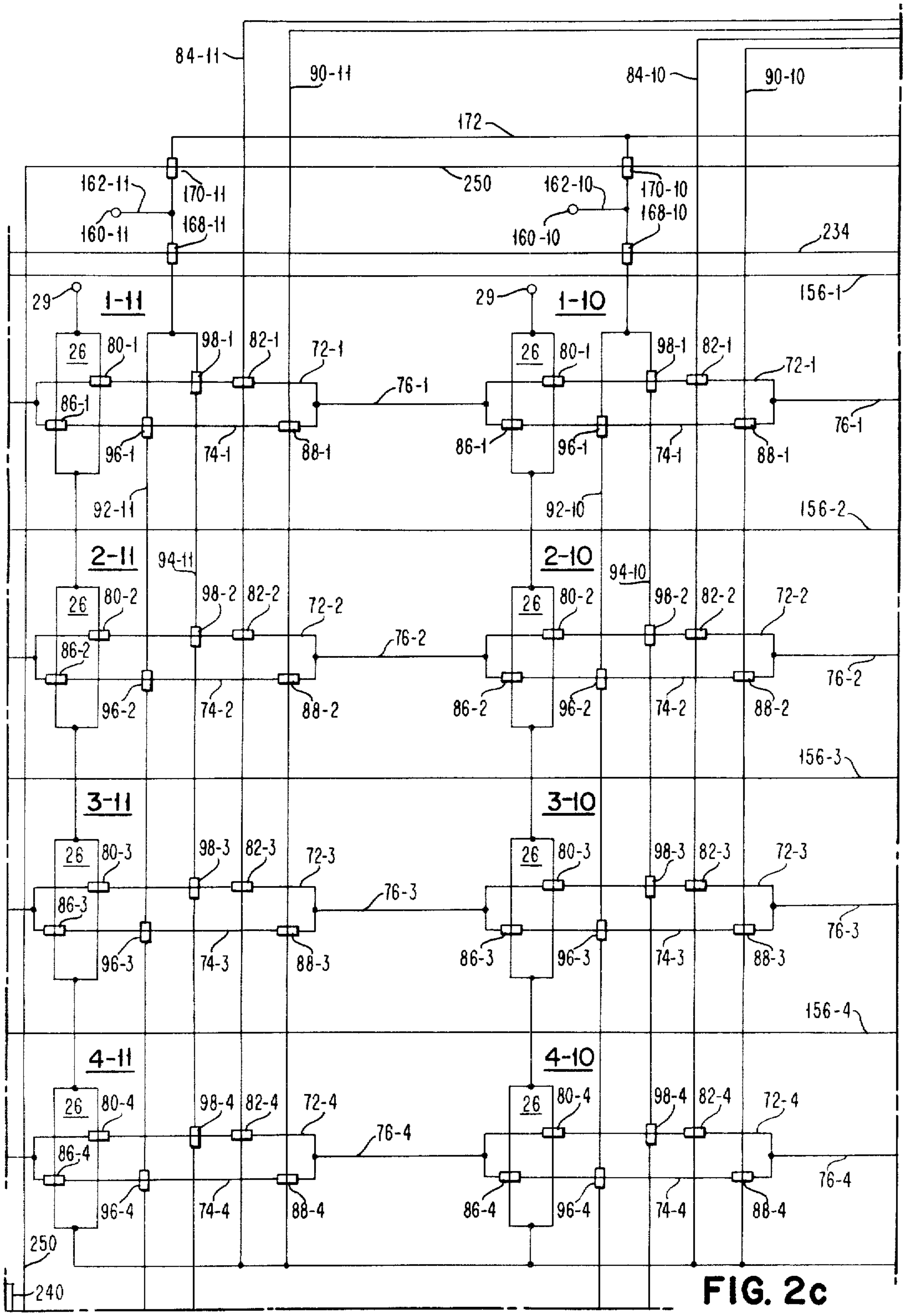
Figure 2D:
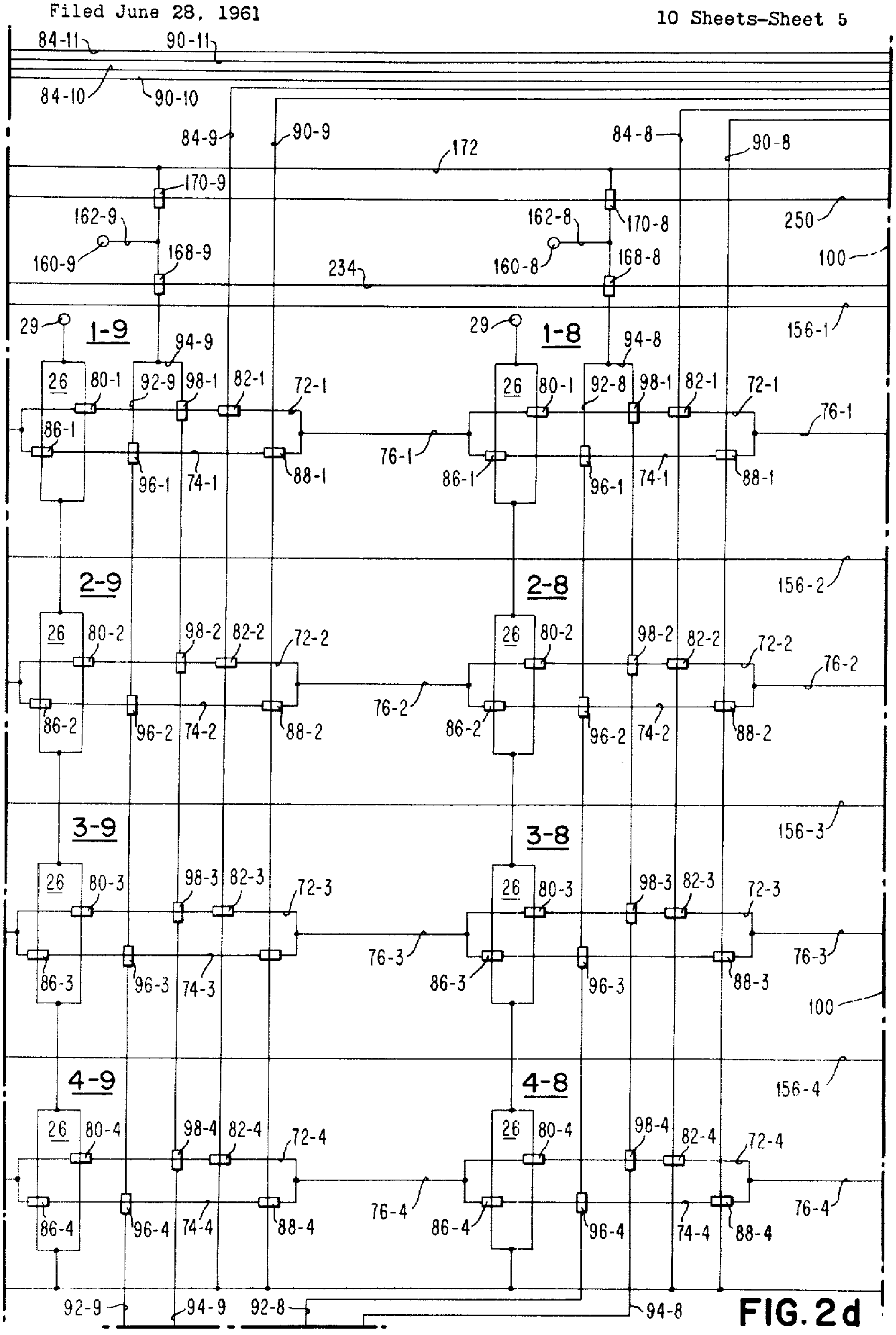
Figure 2E:
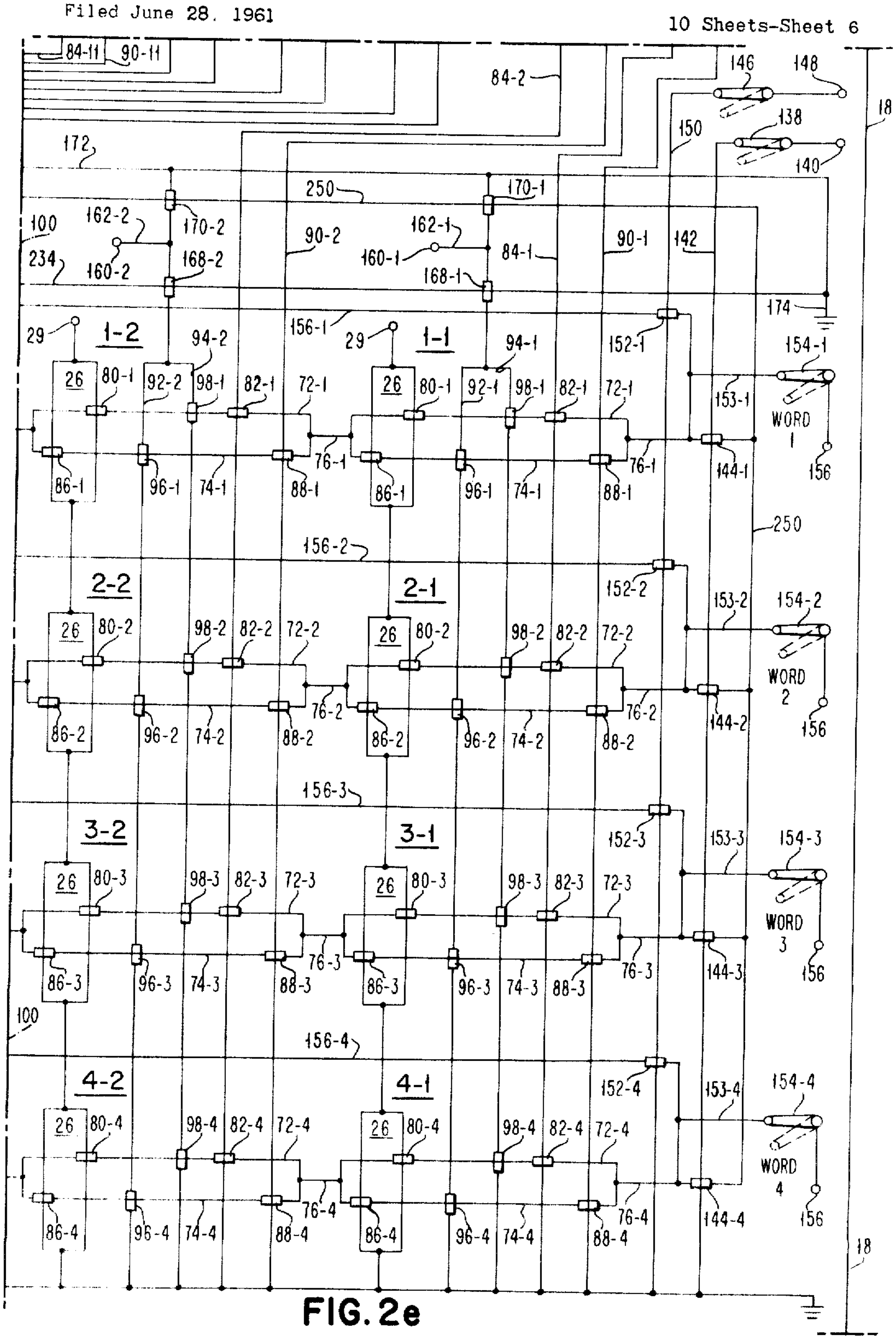

Referring to FIG. 2*b*, the circuit generally designated by the reference numeral 12 in FIG. 1, stores the indication of matches and mismatches and controls the serial-by-word, parallel-by-bit read out of the matching words as well as indicating when the last matching word has been read out. Referring to FIGS. 2*c*, 2*d* and 2*e*, lines designated 160–1 through 160–11, corresponding to bit positions, are connected to current sources represented by terminals 162–1 through 162–11.

Lines 162 are connected through corresponding cryotron gates designated 168–1 through 168–11 to parallel connected pairs of lines 92 and 94, shown also in FIGS. 3*a* and 3*b*. The lines 160 also are connected through corresponding cryotron gates designated 170–1 through 170–11 to a common line 172 which is grounded at 174 in FIG. 2*e*.

Read out of matching words is accomplished through the circuit 12 by groups of pulses designated A, B and C. Referring to the timing chart, FIG. 5, an A pulse is first applied to read out the first matching word in storage. This A pulse is followed by a B pulse which resets part of the read out circuitry. The B pulse is followed by a C pulse for further resetting. This group of A, B and C pulses is followed by other groups of A, B and C pulses, one group for each successive matching word. The A, B and C pulses are provided by successively connecting switches 176, 178 and 180 respectively to power sources represented by terminals 182, 184 and 186.

At the start of a read out operation another switch 188 is operated to connect a line 190 to a power source represented by terminal 192, for a purpose described hereinafter. This switch 188 remains closed until completion of the read out operation.

All during operation of the memory system, a line 196 is connected to a power source represented by terminal 200. The line 196 extends through a parallel circuit corresponding to each word in storage to ground at 202. Each such parallel circuit consists of a left-hand line 204 and a right-hand line 206. Each line 204 and 206 is assigned a suffix in accordance with the word to which it corresponds. The line 204 corresponding to word 1 includes cryotron gate elements 208–1 and 210–1 and also forms the control winding for a cryotron gate 212–1. The line 206–1 corresponding to word 1 includes a cryotron gate element 214–1 and also forms the control winding for a cryotron gate element 216–1. The parallel circuits associated with the other words of storage are identical to the one just described and suffixes 2, 3 and 4 distinguish these described circuits for the words 2, 3 and 4.

The lines 156–1, 156–2, 156–3 and 156–4, each of which carries a current during a mismatching condition of the associated word, form control windings for corresponding cryotron gate elements 208–1, 208–2, 208–3 and 208–4. Therefore, elements 208–2 and 208–4 are rendered resistive indicating a mismatching condition between the data set in the association register 11 and the data stored in words 2 and 4.

The lines 76–1, 76–2, 76–3 and 76–4, which carry currents indicative of matching conditions, form the control windings for corresponding cryotrons 214–1, 214–2, 214–3 and 214–4 and are connected through corresponding cryotron gate elements 218–1, 218–2, 218–3 and 218–4 to ground at 219. The cryotrons 214 form parts of corresponding flip-flops 215. A source of current represented by a terminal 220 is connected by a line 221, to parallel connected pairs of lines 222 and 224, one pair corresponding to each word of storage, which are connected in series between line 221 and ground at 226. Each line 222–1, 222–2, 222–3 and 222–4 is connected in series with a cryotron gate element 228. Each line 224 is connected in series with a cryotron gate element 30 and also forms the control winding for a cryotron element 232.

A line 234 is connected to the switch 180 to receive the C pulses and forms the control winding for each of the cryotrons 228–1, 228–2, 228–3 and 228–4 and continues through the word storage circuitry, FIGS. 2*c*, 2*d* and 2*e* as a control winding for cryotrons 168–1 through 168–11 to ground at 174.

A line 236 adapted to receive B pulses through switch 178 branches into four parallel circuits 236–1, 236–2, 236–3 and 236–4 corresponding to the four words of memory and thence to ground at 238. Each branch 236–1, 236–2, 236–3 and 236–4 includes the corresponding cryotron gate 232 and forms the control winding for the corresponding cryotron gate 210. Only one of the line 236–1 to 236–4 will receive a B pulse at any one time. A line 240 is adapted to receive A pulses through the switch 176. The cryotron gate elements 212–1, 212–2, 212–3 and 212–4 are connected in series with the line 240. The line 240 branches at points 244–1, 244–2, 244–3 and 244–4 forming lines 246–1, 246–2, 246–3 and 246–4. Each line 246 forms the control winding for the corresponding cryotron gate 230 and passes in series through the corresponding cryotron gate element 216 to the corresponding match indicating line 76.

During the association portion of the operation, the switch 188 was open and therefore the cryotrons 218 were not resistive and the currents on line 76–1 and 76–3, indicative of a matching condition, passed through the control windings of cryotrons 214–1, 214–3, through the corresponding cryotron gates 218–1 and 218–3 to ground at 219. The resistive state of cryotrons 214–1 and 214–3 causes the corresponding flip-flop 215 to store an indication of the matching condition of words 1 and 3.

The currents on lines 156–2 and 156–4, indicative of the mismatching condition of words 2 and 4 passed through the control windings of cryotrons 208–2 and 208–4 to ground at 248, thus rendering these latter cryotrons resistive and storing in the corresponding flip-flops 215 the indication of a mismatch with respect to words 2 and 4.

READ OUT OPERATION

The word memory has now been interrogated in accordance with the data set in the association register and the results of this comparison have been stored in various flip-flops 215 by the cryotrons 214 and 208. It is now desired to read the matching words or portions thereof from the word memory. The read out circuit 12 is designed to read the words out serially, although each word is read out parallel by bit. The circuit 12 also is designed to immediately read out the first matching word without unnecessary delay of attempting to read out preceding words which do not match and to read out successive matching words in successive cycles irrespective of the presence of interspersed non-matching words. The circuit also is designed to operate, when the last matching word has been read out, to condition the system for a subsequent operation.

Switch 176 is closed to apply an A pulse to line 240. This pulse proceeds to the branch point 244–1 where it must either follow the line 240 or branch off to line 246–1, depending upon whether a match or mismatch condition is stored for word 1. In this example, a match indication is stored in the first flip-flop 215 and current flows in the left-hand line 204–1 rather than in the right-hand line 206–1. This current renders cryotron 212–1 resistive, whereby the A pulse on line 240 is blocked and is diverted through line 246–1. The A pulse passes through the control winding of cryotron 230–1, thus rendering it resistive, through the cryotron 216–1, which is super-conductive and through the line 76–1. The A pulse follows the same path through the word 1 registers that the read pulse on line 153–1 followed during the association phase of the operation. The A pulse cannot flow through cryotron 218–1 because current on line 190 holds it resistive at this time. The A pulse emerges at the right on line 76–1 of word 1 bit position 1, FIG. 2*e*, and, since the switch 138 is now open and cryotron 144–1 is superconductive, the A pulse passes through cryotron 144–1 to line 250 which forms a control winding for the previously described cryotrons 170–1 through 170–11. The line 250 continues through FIGS. 2*f* and 2*g* for a purpose described hereinafter and then to ground. The current in line 250 renders the various cryotrons 170 resistive whereby a current flowing from a source 160 through a corresponding line 162 is diverted from the usual path through the corresponding cryotron 170 and flows instead through the corresponding cryotron 168 and then through a corresponding line 92 or 94 depending upon the binary 0 or binary 1 state of the corresponding word 1 bit position register 25. All desired word 1 bit positions are read out simultaneously.

Since the data in bit positions 8, 9, 10 and 11 are of interest in the given example, the read out of these positions is described. The A pulse on the line 76–1 flows through the corresponding line 72–1 or 74–1 of each register depending upon the 0 or 1 binary states respectively of the associated register. For example, referring to word 1, bit position 11, which is described as storing a binary 1, the A pulse flows through the line 74–1 since the line 72–1 is held resistive by the current in the control winding of cryotron 80–1. The current in line 74–1 renders cryotron gate 96–1 resistive thereby diverting the current from source 160–11 through the line 94–11 and cryotron gate 98–1 which is in the superconductive state. The cryotrons 96 and 98 in bit positions 11 of words 2, 3 and 4 are ineffective at this time because the A pulse passes only through word 1. The current on line 94–11 emerging at the bottom of word memory 10 represents a binary 1 and is utilized in a manner described hereinafter.

Due to the binary 1 state of bit positions 10 and 8 of word 1, the current from sources 160–10 and 160–8 also flows through lines 94–10 and 94–8. The current from word 1 bit position 9 flows on line 92–9 due to the binary 0 state of word 1 bit position 9 resulting in the resistive state of cryotron 86–1 and the consequent current in the control winding 72–1 of cryotron 98–1.

After word 1 has been read out, the switch 176 is opened to terminate the A pulse and switch 178 is closed to generate a B pulse on line 236. Since the A pulse has rendered cryotron 230–1 resistive, cryotron 232–1 is superconductive and passes the B pulse on line 236–1 thereby rendering cryotron 210–1 resistive and switching the current on line 204–1 to line 206–1. This constitutes resetting of the word 1 match indicator circuit which includes cryotrons 208–1 and 214–1. Current does not flow in lines 236–2, 236–3 and 236–4 since the cryotrons 230–2, 230–3 and 230–4 are superconductive and the current flowing in the lines 224–2, 224–3 and 224–4 render the cryotrons 232–2, 232–3 and 232–4 resistive, thereby inhibiting the currents.

The switch 178 is then opened, terminating the B pulse. Switch 180 is closed to commence a C pulse on the line 234. The C pulse passes through the control winding of cryotron 228–1 rendering it resistive and switching the current from line 222–1 to the line 224–1. The C pulse continues through control windings of cryotrons 228–2, 228–3 and 228–4 where it is ineffective due to the fact that the existing currents already are flowing in the lines 224–2, 224–3 and 224–4. The C pulse continues on line 234 to the word memory 10 where it flows through the control windings of the cryotrons 168–1 through 168–11, thereby rendering these cryotrons 168 resistive and diverting the current from sources 160 back through the cryotrons 170 to ground, since the A pulse has been terminated and the cryotrons 170 are no longer resistive.

At the beginning of this and each succeeding A pulse, switch 146 is closed to place an inhibit current in line 150 to render cryotrons 152–1, 152–3 and 152–4 resistive to prevent the A pulse from flowing through line 156 to ground.

Read out of the first matching word in storage is now complete. Switch 180 is opened to terminate the C pulse and switch 176 is closed to commence a second A pulse to read out the next matching word of storage. The register comprising cryotrons 208–1 and 214–1 and associated with word 1 has been reset by the B pulse whereby current from the line 196 now flows through the line 206–1. A mismatch in the comparison of word 2 caused cryotron 208–2 to be rendered resistive whereby the current from line 196 flows in the right-hand line 206–2 and renders cryotron 216–2 resistive. The A pulse on line 240 cannot flow through the line 246–1 and the now resistive cryotron gate 216–1 and therefore flows through the superconductive gate 212–1 to the point 244–2. At this point the current cannot flow through the line 246–2 and the resistive cryotron 216–2, but it can flow through the line 240 and the superconductive cryotron 212–2 to the point 244–3. It will be noted that a read out current does not appear on the line 76–2 to read out word 2. This is proper since word 2 was not matched by the associative data in association register 11.

Word 3 did match the data in register 11 and therefore word 3 should be read out by this same A pulse. Since the comparison pulse on line 76–3 rendered cryotron 214–3 resistive, the current from line 196 flows in the line 204–3 and renders cryotron 212–3 resistive, causing the A pulse to be diverted at point 244–3, through the line 246–3 thus rendering cryotron 230–3 resistive and flowing on through the superconductive cryotron 216–3, line 76–3, through the series of lines 72–3 and 74–3 previously followed by the read pulse on line 76–3 and through the now superconductive gate 144–3 and line 250. The A pulse on line 250 renders the cryotrons 170–1 through 170–11 resistive, diverting the current from corresponding sources 160 through the cryotrons 168–1 through 168–11 and the appropriate lines 92 and 94 in accordance with the data recorded in the various bit positions of word 3.

Again, a B pulse is generated to reset the match indicating register comprising cryotrons 208–3 and 214–3 after which a C pulse is generated to reset cryotron 228–3 and divert the current on line 222–3 back to the line 224–3.

Another A pulse is generated but it will be noted that since word 4 did not match the data in the association register, all matching words have by this time been read out of word storage. The A pulse flows through line 240, cryotron 212–1, 212–2, 212–3 and 212–4.

This current continues to the analyzing circuits in FIGS. 2*f*, 2*g* and 2*h*, indicating that the last matching word has been read out of storage and operating in a manner described hereinafter, to alter the data in the association register. Any suitable indicating device such as a light may be actuated by the signal on line 240 to indicate that the last matching word has been read out. Such a device is shown schematically on FIG. 2*b* where it is designated 241.

ANALYZING CIRCUIT

Referring to FIGS. 1, 2*f*, 2*g* and 2*h*, that portion of the circuit designated 14, in FIG. 1, and referred to hereinbefore as analyzing circuitry will now be described. The binary 0 output lines 92–11, 92–10, 92–9 and 92–8 and the binary 1 output lines 94–11, 94–10, 94–9 and 94–8 from the word memory 10 comprise inputs to the analyzing circuit 14.

Circuitry generally designated 268 is associated with the lines 92–11 and 94–11 to selectively assign various weights to the inputs on these lines in the analysis of these input signals with respect to input signals from the other lines 92 and 94. Three lines 270, 272 and 274 are connectable selectively with power sources designated by terminals 271, 273 and 275 respectively, through switches 276, 278 and 280 respectively. In the analyzing circuit 268, current applied to line 270 applies a weight of 1; current on line 272 applies a weight of 2; and current on line 274 applies a weight of 3. It is noted that regardless of the weighting applied, an input on the binary 0 line 92–11 effects an output from the circuit 268 on a 0 designated line. However, an input on the binary 1 line 94–11 effects an output on lines having value designations of 1, 2 or 3 in accordance with the particular applied weighting.

Circuitry generally designated 282 is associated with the lines 92–10 and 94–10 and is similar to the circuit 268 associated with lines 92–11 and 94–11. In the analyzing circuit 282, a line 284 is connectable through a switch 286 to a power source represented by terminal 287. The current in line 284 applies a weight of 1 to input signals on lines 92–10 and 94–10 similar to the weighting in circuit 268. A line 288 is connectable through a switch 290 to a power source represented by a terminal 291. The current in line 288 applies a weight of 2 to input signals. It will be apparent that circuits could be designed within the scope of this invention to apply weights other than 1, 2 or 3 to the input signals.

Circuitry generally designated 292 is associated with lines 92–9 and 94–9. Similar circuitry generally designated 294 is associated with lines 92–8 and 94–8. A signal coming into the circuit 292 or 294 from the left will be on a line having a particular assigned value in accordance with the accumulative weighted values of binary inputs entered into the circuitry to the left thereof. The circuit 292 or 294 operates in response to a signal on the corresponding binary 1 line 94–9 or 94–8 to increase by 1 the value which is fed into this circuit from the left. Inputs on the binary 0 lines 92–9 and 92–8 do not increase the accumulative value.

To the right of the circuit 294 are circuit groups 296, 298 and 300. The circuit 296 is operable in accordance with the accumulative value in circuits 268, 282, 292 and 294 to indicate by output signals on lines 302–0 through 302–7 that the value is 0, only 1, only 2, only 3, only 4, only 5, only 6, or only 7.

The circuit 298 is similarly operable to indicate by output signals on lines 303–1, 303–2, 303–3, 303–4, 303–5, and 303–6 that the accumulative value is at least 1, at least 2, at least 3, at least 4, at least 5, at least 6, or at least 7.

The circuit 300 is operable to indicate by output signals on lines 304–1 and 304–2 that the accumulative value is at least 1 but not more than 3, or at least 2 but not more than 4.

It will be apparent that the circuit 296 could be expanded to indicate any value. However, the maximum value possible in the illustrated circuitry is 7. It also will be apparent that the circuit 298 could be similarly expanded and that circuit 300 could be arranged to indicate other spans of values.

ANALYZING CIRCUIT OPERATION

Figure 2F:
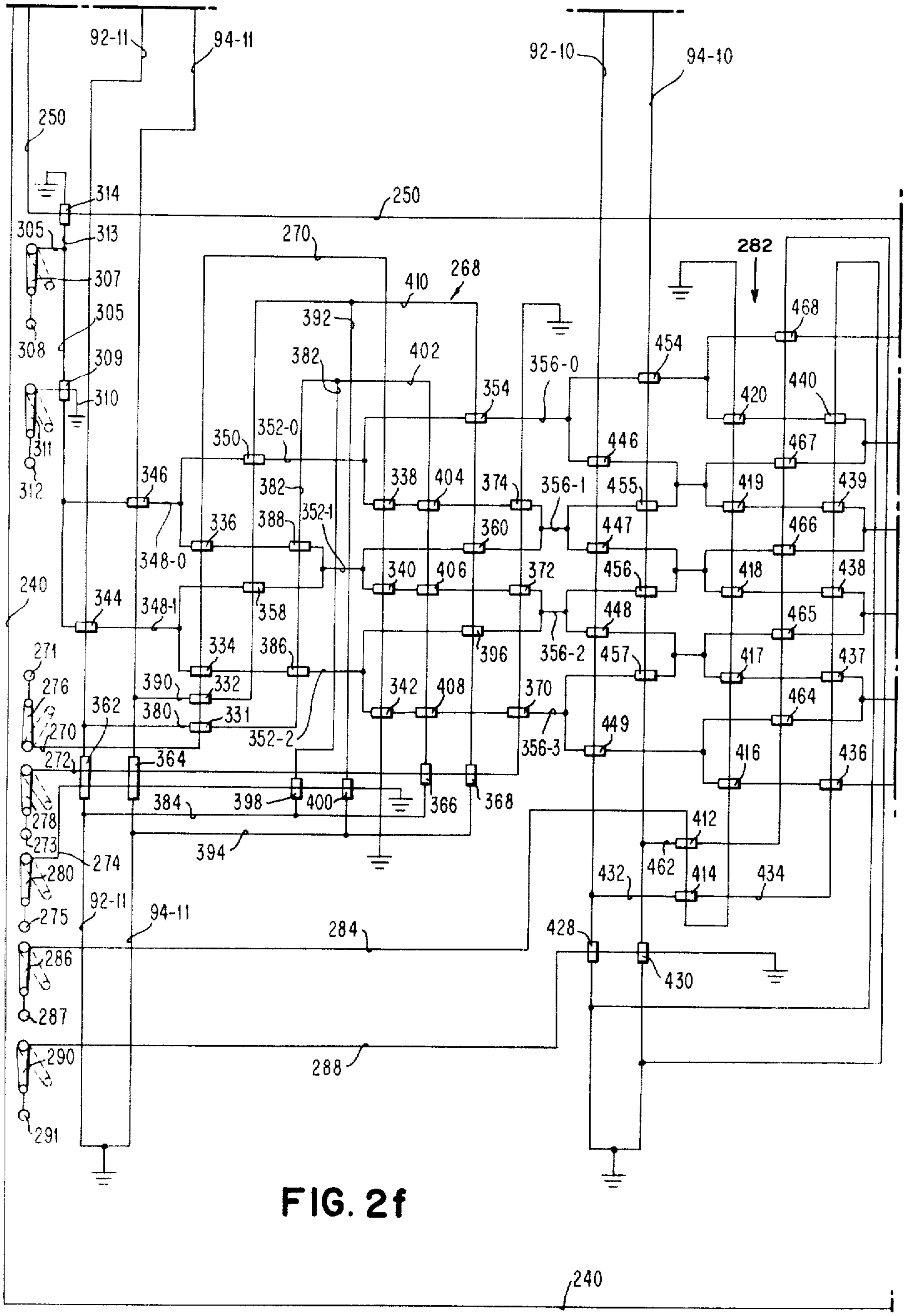

A single input line 305, FIG. 2*f*, forms the top of a circuit tree which expands as it progresses from left to right through the various circuits 268, 282, 292, 294, 296, 298 and 300 to ground at 306. The line 305 may be connected through a switch 307 to a power source represented by a terminal 308.

The line 305 includes a cryotron gate element 309 having a control winding formed by a line 310. The line 310 may be connected by a switch 311 to a power source represented by a terminal 312. A line 313 branches from the line 305 and includes a cryotron gate element 314. The line 250 extends from FIGURE 2*c* and forms a control winding for the gate element 314. The line 250 continues to form the control winding for a cryotron gate element 316 in a circuit generally designated 317. The circuit 317 consists of a pair of parallel connected lines 318 and 319. The lines 318 and 319 are connected at one end to a power source represented by a terminal 320 and are connected at the other end to ground. The line 319 includes the gate element 316 and forms the control winding for eight cryotron gate elements designated 321–0 through 321–7, seven cryotron gate elements designated 322–1 through 322–7, and two cryotron gate elements designated 323–1 and 323–2.

The line 318 includes a cryotron gate element 324 and forms the control winding for eight cryotron gate elements designated 325–0 through 325–7, seven cryotron gate elements designated 326–1 through 326–7, and two cryotron gate elements designated 327–1 and 327–2.

A line 328 forms the control winding for cryotron gate element 324. The line 328 is connectable by a switch 329 to a power source represented by a terminal 330.

Prior to read out of the first word from memory 10, the switch 307 is closed, as is one of the three switches 276, 278 or 280, in accordance with the desired weighting of binary 1 signals on line 94–11, and one of the switches 286 or 290 in accordance with the desired weighting of binary 1 signals on the line 94–10. Also at this time the switch 311 is closed to pass current through the control winding 310 and render the cryotron gate element 309 resistive whereby current is diverted through the line 313 to ground and any current paths previously established in the Christmas tree network commencing with line 305 are destroyed. The switch 329 also is closed to render the cryotron gate element 324 resistive and divert the current from the source 320 into the line 319. The switch 583 is closed to render gate element 582 resistive and divert any current in line 564 to line 562. The switch 583 and circuits 562 and 564 are described in greater detail hereinafter. Having thus diverted the currents, the switches 311, 329 and 583 are opened and the read out and analyzing portion of the operation may commence.

First, assume that, for all words in memory, a weight of one is to be given to each signal on the line 94–11 and, therefore, the switch 276 is closed.

Current flows from supply source 271, through switch 276 and line 270, through the control windings of cryotrons 331, 332, 334, 336, 338, 340 and 342 to ground, thereby rendering the foregoing cryotrons resistive. A current on the line 92–11 indicative of a binary 0 stored in one of the eleventh position bit registers 1–11, 2–11, 3–11 or 4–11 renders cryotron 344 resistive, thereby diverting the current on line 305 through the superconductive cryotron 346 and line 348–0 (the 0 in 348–0 indicating the count value zero). Since cryotron 336 is resistive, the current on line 348–0 is diverted through cryotron 350 and line 352–0 and, since cryotron 338 is resistive, through the cryotron gate 354 to the line 356–0 as a count of 0. The line 356–0 is one of four inputs to the circuit 282. The current on line 92–11 flows to ground.

If the current is on line 94–11 rather than on 92–11, thus indicating a binary 1 count, the cryotron 346 is resistive and the current on line 322 is diverted through cryotron 344, line 348–1, cryotron 358, line 352–1, and through cryotron 360 to line 356–1, thus feeding into circuit 282 as a 1 count. The signal on line 94–11 is fed directly to ground.

Assume now that the switch 278 has been closed whereby each binary 1 count on the line 94–11 is given a weight of 2. This means that each count coming into the circuit 268 is doubled and is fed to the circuit 282 as a count of 2.

The current on line 272 flows through the control windings of cryotrons 362, 364, 366, 368, 370, 372 and 374 to ground, thus rendering these cryotrons resistive. Current on the line 92–11 renders cryotron 344 resistive and is diverted by the resistive state of cryotron 362 to flow through lines 380, 382 and 384, back to line 92–11 and ground. Current on line 380 renders cryotrons 386 and 388 resistive. The resisitive state of cryotron 344 diverts the current on line 322 through cryotron 346, line 348–0, cryotron 350, line 352–0 and cryotron 354 to the zero line 356–0, thus entering circuit 282 as a count of 0. The current on line 348–0 could not flow to line 352–1 due to the resistive state of cryotron 388. The current could not flow to line 356–1 because of the resistive states of cryotron 374.

If the current is on line 94–11 rather than on line 92–11 and switch 278 is closed, the current cannot flow directly to ground due to the resistive state of the cryotron 364, but instead is diverted through lines 390, 392, 394, back to line 94–11 and then ground. It will be noted that the current in line 390 renders cryotrons 358 and 350 resistive. The current on line 322 is therefore diverted through cryotron 344, line 348–1, cryotron 334 (since cryotron 358 is resistive), cryotron 386, line 352–2 and cryotron 396 (since cryotron 370 is resistive), to line 356–2, thus flowing into the circuit 282 as a count of 2.

Assume now that the switch 280 is closed whereby a weight of 3 is to be applied to each binary 1 count on line 94–11. The current on line 274 flows through the control windings of the cryotrons 362, 364, 398 and 400 to ground, thus rendering these cryotrons resistive. A current on line 92–11 is inhibited by the resistive state of cryotron 362 from flowing directly to ground at 260 and therefore is diverted through lines 380, 402 and 384 back to line 92–11 and then to ground, thus rendering cryotrons 386, 388, 404, 406 and 408 resistive. The current on line 322 is diverted through the cryotron 346, line 348–0, cryotron 350, line 352–0, cryotron 354 (since cryotron 404 is resistive) to line 356–0, thus feeding into circuit 282 as the value 0. The other path for the current was blocked by the resistive states of cryotron 388.

With the switch 280 closed and binary 1 current on line 94–11, the current flows to ground through lines 390, 410, 394 and 94–11, thereby rendering cryotrons 358, 350, 354, 360 and 396 resistive. The current on line 322 is diverted through cryotron 344, line 348–1, cryotrons 334 and 386 (since cryotron 358 is resistive), line 352–2 and cryotrons 342, 408 and 370 (since cryotron 396 is resistive), to the line 356–3, thus entering the circuit 282 as a 3 count.

The circuit to 282 is similar to the circuit 268 but is simplified since it is designed to apply only a weight of 1 or 2 to a binary 1 signal on line 94–10 by closing the respective switches 286 or 290. With the switch 286 closed to apply a weight of 1 to each incoming binary 1 pulse, cryotrons 412 and 414 are rendered resistive as are cryotrons 416–420. A current on line 92–10 flows directly to ground and an incoming current on any line 356–0, 356–1, 356–2 or 356–3 (representative of values 0, 1, 2 or 3 respectively) due to the resistive states of cryotrons 416–420 passes through the circuit 282 to the correspondingly valued output line 426–0, 426–1, 426–2 or 426–3, thus indicating that 0 has been added to the input count.

With the switch 290 closed to apply a weight of 2 to each binary 1 input, and cryotrons 428 and 430 rendered resistive by current on the line 288, the current on line 92–10 cannot flow directly to ground, but instead is diverted through lines 432 and 434, thus rendering the cryotrons 436–440 resistive. Cryotrons 446–449 are rendered resistive by current in the line 92–10. Therefore, an input on a line 356–0, 356–1, 356–2 or 356–3 is directed through circuit 282 by the resistive cryotrons to emerge on a correspondingly valued output line 426–0, 426–1, 426–2 or 426–9, thus indicating that 0 has been added.

With the switch 286 closed and a current on line 94–10 indicative of a binary 1 count, the current flows directly to ground and, in so flowing, renders cryotrons 454–457 resistive. The cryotrons 416–420 are rendered resistive by the current on line 284 and thus, a current on an input line 356–0, 356–1, 356–2 or 356–3 is diverted to an output line 426–1, 426–2, 426–3 or 426–4 having a value 1 higher than the input value.

With the switch 290 closed to give a weight of 2 to each input signal on the line 94–10, the current on 94–10 cannot flow directly to ground because of the resistive state of the cryotron 430. Therefore, the current is diverted through a line 462 thus rendering the cryotrons 464–468 resistive. The resistive state of those cryotrons and cryotrons 454–457 causes an input on a line 356 to be directed through the circuit 282 whereby it emerges on a line 426 having a value 2 higher than the value of the input line 356.

Referring to circuit 292, it will be apparent that a current on line 92–9 renders cryotrons 470–475 resistive whereby an incoming current on a line 426 is directed to a line 476 having a corresponding value thus indicating that zero has been added to the incoming value.

Similarly, it will be apparent that a current on line 94–9 renders cryotrons 477–482 resistive whereby an incoming current on a line 426 is directed to a line 476 having a value 1 higher than the value of the input line, thus indicating that a one count has been added to the incoming value.

Circuit 294 is identical to circuit 292 and a current on line 92–8 renders cryotrons 484–490 resistive whereby an incoming current on a line 476 is directed to a line 492 having a corresponding value, thus indicating that a zero count has been added to the incoming value. A current on line 94–8 renders cryotrons 494–500 resistive whereby an incoming current on a line 476 is directed to a line 492 having a value 1 higher than the input line 476, thus indicating that a 1 count has been added to the incoming value.

The circuit 296 consists of 8 horizontal rows of 8 cryotrons each, the rows being designated 503–510. The 8 horizontal rows are arranged in 16 vertical columns. The lines 492–0 through 492–7 which comprise the output lines from circuit 294 comprise the input lines to circuit 296. Each line 492 forms the control winding for all 8 cryotrons of an associated row. Starting at the left, the odd numbered columns of cryotrons in the circuit 296 contain 7 cryotrons each series connected in lines 302–0 through 302–7. The even numbered columns contain single cryotrons in lines 511–0 through 511–7. It will be noted that where a cryotron is present in an even numbered column, the cryotron in the correpsonding odd numbered column within that same row is absent. The lines 511–0 through 511–7 are common connected at their lower ends to ground.

The cryotrons 321–0 through 321–7 which have the line 319 for a control winding are included in the corresponding lines 302–0 through 302–7. The cryotron gate elements 325–0 through 325–7 are included in lines 512–0 through 512–7 which are common connected to ground. Lines 302 and 512 having common suffixes are common connected through switches 513–0 to 513–7 to power sources represented by terminals 514–0 through 514–7.

When one or more words in data memory match the association data, the accumulative count from the circuits 268, 282, 292 and 294 will be 0. 1, 2, 3, 4, 5, 6 or 7. Depending upon the requirements of the particular circuit being conducted, one of the switches 513–0 through 513–7 will be closed. For example, it may be desired to accumulate statistics relating to persons who have had one or more of the ailments being associated on, where the weighted accumulative value is 4. In this case, the switch 513–4 is closed.

When the count is zero, the current on line 492–0 renders the cryotron in line 511–0 resistive, thereby preventing current from flowing therethrough even if switch 513–0 is closed. However, since all the cryotrons in the line 302–0 are superconductive, the current may flow through the line 302–0 to counter or any desired indicating device 516–0, to enter therein an indication that none of bit positions 8, 9, 10 or 11 of words 1, 2, 3 and 4 contains a binary 1.

Similarly, a current on the line 492–1 will inhibit the line 511–1 but will permit a current on the line 302–1 if switch 513–1 is closed. Similarly, currents on all the other lines 492 will inhibit the single cryotron in the corresponding line 511 and will permit current to pass through the corresponding line 302 in accordance with the cumulative count, provided the corresponding switch 513 is closed. It will be noted that a current on any one of the lines 492 will render resistive a cryotron in every one of the lines 302 except the one corresponding in value to the energized line. For example, when the line 492–7 is energized to indicate an accumulative count of 7, a cryotron in each of the lines 302–0 through 302–6 is rendered resistive whereby currents cannot flow in these lines. At the same time, the line 492–7 does not link a cryotron in line 302–7 and therefore the current is permitted to pass to the counter 516–7 to indicate that the count is 7. This line 492–7 inhibits the alternate circuit for the pulse by rendering a cryotron in line 511–7 resistive, whereby the only path the current can follow is the line 302–7. The same is true with respect to all other input lines 492 when corresponding lines 492 are energized.

Since current is now flowing in the line 319, the gate elements 321 are inhibited from passing current from the corresponding sources 514. During read out of each word, the A pulse that reads out the matched word in storage and flows through the line 250 to inhibit cryotron gates 170 also flows through the gate element 314 to inhibit line 313 and permit current to flow through the line 305 to the circuits 268, etc. and also flows through the control winding of gate element 316 to inhibit line 319 whereby the gate elements 321 become superconductive and may pass a current from the corresponding source 514 if the corresponding switch 513 is closed. It is thus apparent that current can flow through a line 302 or 511 only at a time when a matching word is being read out of word memory 10. When the gate element 316 is thus inhibited, current is diverted to the line 318 and via the gate elements 325 inhibits the alternate paths to ground.

Circuit 298 is designed to give an indication that the count is at least 1, at least 2, at least 3, at least 4, at least 5, at least 6, or at least 7. This circuit is also arranged in eight horizontal rows of several cryotrons each, the rows being designated 518 to 525. The cryotrons in these eight rows are arranged in 14 vertical columns. The cryotrons in the odd numbered columns starting at the left are series; connected in lines 303–1 through 303–7. The cryotrons in the even numbered columns starting at the left are series connected in lines 526–1 through 526–7. Each line 526 is paired with and connected at its upper end to a corresponding line 303. These paired lines are connectable through switches 527–1 through 527–7 to power sources represented by terminals 528–1 through 528–7. The cryotron gate elements 322 are included in the lines 303 having identical suffixes. The gate elements 326 are included in lines 529 branching from the lines 302. The lines 529 are common connected at their lower ends to ground. As described with respect to a circuit 296, the gate elements 322 are rendered superconductive when a word is read out of data memory 10.

The lines 492–0 through 492–7 extend through the respective rows of cryotrons 518–525 forming the control windings for cryotrons in those rows. When current is applied to the line 492–0 indicative of a zero count, a cryotron in each of the lines 303–1 through 303–7 is rendered resistive. Current then may flow through any line 526 which is connected by its corresponding switch 527 to the corresponding power source 528. Therefore with a zero accumulative count from the circuitry to the left, none of the lines 303 is pulsed and therefore none of the counters in the group 530 is actuated.

With a current on line 492–1 indicative of a 1 count, cryotrons in the lines 526–1 and 303–2 through 303–7 are rendered resistive whereby current may flow only through the line 303–1 to the associated counter 530–1 to indicate that the accumulative count is at least 1, provided the switch 527–1 is closed, or through lines 526–1 through 526–7. With a current on the line 492–2 indicative of a 2 count, the cryotrons in lines 526–1, 526–2 and 303–3 through 303–7 are rendered resistive. Current may flow through line 303–1 or 303–2 to the associated counter 530–1 or 530–2 provided the switch 527–1 or 527–2 is closed or through lines 526–3 through 526–7. With current applied to 492–3 indicative of a 3 count, the cryotrons in lines 526–1, 526–2, 526–3 and 526–4 through 303–7 are rendered resistive. With the appropriate switches closed, current may flow in the lines 303–1 through 303–3, actuating counter 530–1 through 530–3 thus indicating an accumulative count of at least 3 or through lines 526–4 through 526–7. Similarly, current on lines 492–4, 492–5, 492–6 and 492–7 renders appropriate cryotrons in the circuit 298 resistive whereby the counters 530–4, 530–5, 530–6 and 530–7 respectively are actuated to indicate counts of at least 4, at least 5, at least 6 and at least 7 respectively. It will be noted that a higher count will actuate a lower valued counter 530 if the corresponding lower valued switch 527 is closed. The lines 526 are common connected to ground at their lower ends.

Referring to the circuit 300, the lines 492–0 through 492–7 thread 8 rows of 2 cryotrons each, designated 535–542. These 8 rows of cryotrons are arranged in 2 pairs vertical columns and, similar to the arrangement in circuit 296, the pairs of columns of cryotrons are complementary in as much as a cryotron exists in only one column of the pair for each row. The left-hand line 304–1 is paired with the adjacent line 543–1 whereas the third line from the left, 304–2 is paired with the fourth line 543–1. The line 304–1 is designated "at least 1 but not more than 3" whereas the line 304–2 is designated "at least 2 but not more than 4." Currents on lines 492–0, 492–4, 492–5, 492–6, or 492–7 renders a cryotron in line 304–1 resistive and prevent current from flowing therethrough, whereby this current is diverted through the line 543–1 to ground.

Current is applied to the lines 304–1, 543–1, 304–2 and 543–2 through switches 544–1 and 544–2 from power sources represented by terminals 545–1 and 545–2.

Thus, with the switch 544–1 closed, it is seen that, when the count is at least 1 but not more than 3 (i.e., when the count is either, 1, 2, or 3), the line 543–1 is resistive and current flows in the line 304–1 to the counter 546–1. Similarly, current in any line 492–0, 492–1, 492–5, 492–6 or 492–7 renders a cryotron in line 304–7 resistive and diverts current through the line to ground. When the count is at least 2, but not more than 4 (i.e. 2, 3 or 4), current is present in either line 492–2, 492–3, or 492–4 and inhibits a cryotron in the line 543–2 whereby current flows through the line 304–2 to the counter 546–2.

By selective operation of the switches 513, 527 and 544, the desired conditions may be selected. When the desired count is achieved, a corresponding counter 516, 530 or 546 is actuated.

The cryotron gate elements 323–1 and 323–2 are included in the respective lines 304–1 to 304–2 to enable these lines to receive a current from the associated sources 545 during the time a word is being read out of memory 10. Lines 548–1 and 548–2 branching from the lines 304–1 and 304–2 include the cryotron gate elements 327–1 and 327–2.

Figure 2G:
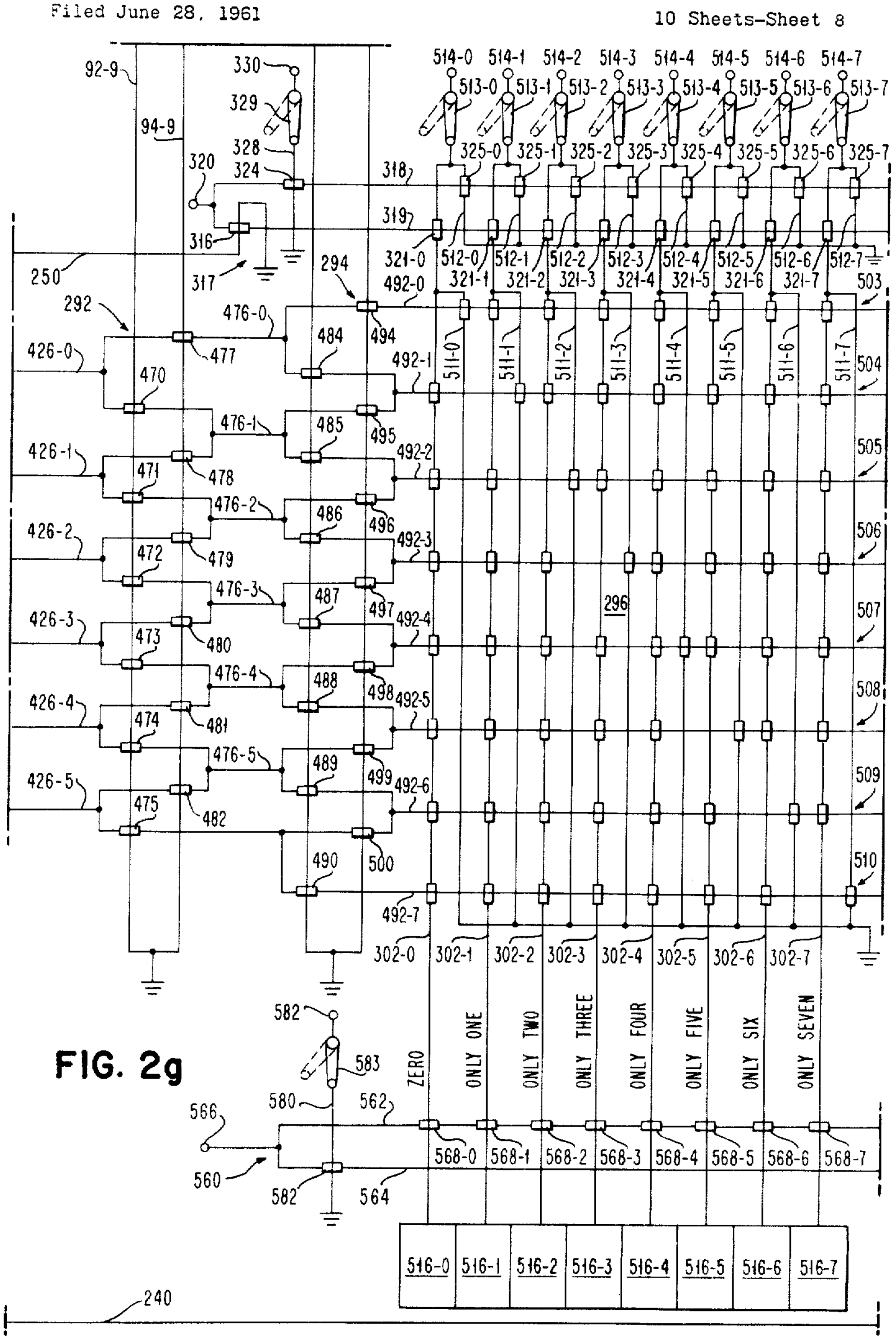
Figure 2H:
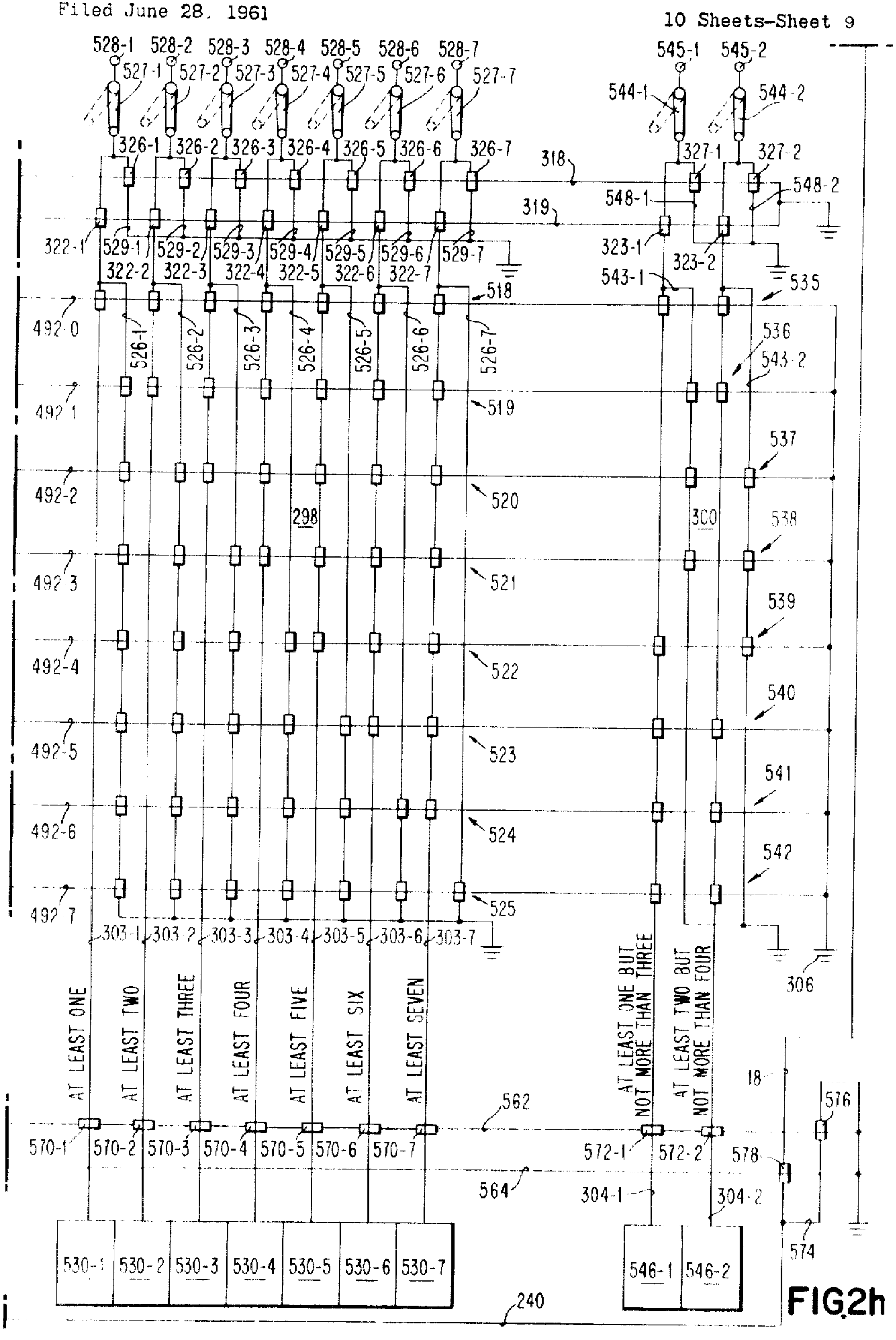

Referring to FIGURES 2*g* and 2*h*, a circuit generally designated 560, including lines 562, 564 and 240 is shown. This circuit operates, in conjunction with the analyzing circuits 296, 298 and 300 and the end-of-readout signal on line 240, to alter the contents of the association register set unit 16, in preparation for a next succeeding association operation when a selected criterion has not been met by any of the matching words in memory.

The lines 562 and 564 are parallel connected between a current source represented by a terminal 566 and ground. During operation of the system the current from source 566 flows to ground through either line 562 or 564, depending upon the resistive state of cryotrons in these two lines.

Eight cryotron gate elements designated 568–0 through 568–7 are series connected in the line 562. Each cryotron 568 is associated with the line 302 having the same suffix. The associated line 302 forms a control winding for the associated cryotron gate element 568.

Seven cryotron gate elements designated 570–1 through 570–7 are also series connected in the line 562 and have lines 303–1 through 303–7 for control windings in accordance with these suffixes.

Two cryotron gate elements designated 572–1 and 572–2 also are series connected in the line 562 and have lines 304–1 and 304–2 respectively for control windings.

After reading out of each matching word in the memory, switches 311, 329 are closed momentarily to reset the associated circuits in preparation for reading out the next matching word.

By observing the outputs of the circuits 296, 298 and 300 after each word is read out, the desired information regarding the person identified by that word may be obtained.

Referring to FIGURE 2*h*, the line 240 branches into the line 18 and a line 574 which runs to ground. The line 574 includes a cryotron gate element 576. The line 562 forms a control winding for the gate element 576. The line 18 includes a cryotron gate element 578. The line 564 forms a control winding for the gate element 578.

A line 580 forming the control winding for a cyrotron gate element 581 connected in series with the line 564 runs to ground. Current is supplied to the line 580 from a current source represented by a terminal 582, through a switch 583.

As described herein before, at the initiation of the association operation when current is applied to lines 153 through switches 154, current also is applied to the line 580 via the switch 583. This latter current renders the cryotron gate 582 resistive and diverts the current from the source 566 through the line 562 to ground.

First, assume that the interrogation conditions have been met by at least one of the words in memory and an output is derived on one of the lines 302, 303 or 304 in accordance with the interrogation. Assume that this signal is on line 302–0, although the effect is identical regardless of the line 302, 303 or 304 upon which the current appeared. The result also is the same if more than one matching word meets the designated criteria. The current on line 302–0 renders cryotron gate element 568–0 resistive and diverts the current from line 562 to line 564. The current in line 564 flows through gate element 581, since the current on line 580 has been removed, and through the control winding of cryotron gate element 578 to ground, rendering the gate element 578 resistive. After the last matching word has been read from the word memory 10, the next A pulse on line 240 is diverted by the resistive state of gate element 578 through gate element 576 to ground. In this instance the pulse on line 240 is ineffective.

Assume now that the desired criteria set up in the switches 513, 527 or 544 are not met and current does not appear on any of the lines 302, 303 or 304. Now, when the A pulse following read out of the last word in memory 10 arrives on line 240, it is diverted by the resistive state of cryotron gate element 576 and flows through the superconductive gate element 578 to the line 18. As described hereinbefore, the current on line 18 advances the association register set unit 16 by a count of 1 thus establishing a new criteria for association in the word memory 10.

The next association operation is commenced, including applying current to the line 580 to assure that current is flowing on line 562 rather than the line 564.

While the invention has been particularly shown and described with reference to a preferred embodiment thereof, it will be understood by those skilled in the art that various changes in form and details may be made therein without departing from the spirit and scope of the invention.

What is claimed is:

1. An associative memory system comprising, in combination, an *n* word associative data memory, an association register for storing an association word, means for comparing said association word coincidently with said *n* words of associative data memory and deriving match and mismatch indicating signals on *n* match lines and *n* mismatch lines, means including said match lines for reading matching words out of said memory, *n* match-mismatch indicating means including *n* match indicating circuits operable by match indicating signals on corresponding said match lines, *n* mismatch indicating circuits operable by mismatch signals on corresponding said mismatch lines, *n* first gating means one associated with each of said $n$ match indicating circuits, $n$ second gating means one associated with each of said $n$ mismatch indicating circuits, an interrogation circuit linking said second gating means in series and branching before each of said second gating means each said branch linking an associated one of said first gating means and connecting to an associated one of said match lines, each mismatch indicating means being effective when operated to open the corresponding said second gating means to pass a signal on said interrogation circuit through a corresponding said second gating means to a next succeeding match-mismatch indicating means, each match indicating means being effective when operated to open the corresponding said first gating means to pass said signal on said interrogation circuit through corresponding said first gating means to a corresponding said match line.

2. The invention of claim 1 including means operable after each said interrogation signal for resetting the match-mismatch indicting means associated with the last previously read out word to the mismatch indicating state whereby the next interrogation signal is passed to the next succeeding match-mismatch indicating circuit and $m$ matching words are read out by $m$ successive interrogation signals where $m$ may be any number not exceeding $n$.

3. The invention of claim 2 including means operable during the $m+1$ cycle for indicating that all $m$ matching words have been read out.

4. The invention of claim 2 including indicating means connected in said series interrogation circuit after the last said match-mismatch indicating circuit and operable by the $m+1$ interrogation signal for indicating that all $m$ matching words have been read out.

5. An associative memory system comprising, in combination, an $n$ word associative data memory, an association register for storing an association word, means for comparing said association word coincidently with said $n$ words of associative data memory and deriving match and mismatch indicating signals on $n$ match lines and $n$ mismatch lines, means including said match lines for reading matching words out of said memory, $n$ cryogenic match-mismatch indicating means including $n$ match indicating cryotron gate elements operable by match indicating signals on corresponding said match lines, $n$ mismatch indicating cryotron gate elements operable by mismatch signals on corresponding said mismatch lines, $n$ first cryotron gate elements one associated with each of said $n$ match indicating elements, $n$ second cryotron gate elements one associated with each of said $n$ mismatch indicting element, an interrogation circuit linking said second gate elements in series and branching before each of said second gate element, each said branch linking an associated one of said first gate elements and connecting to an associated one of said match lines, each mismatch indicating gate element being effective when operated to open the corresponding said second gate element to pass a signal on said interrogation circuit through corresponding said second gate element to a next succeeding match-mismatch indicating means, each said match indicating gate element being effectve when operated to open the corresponding said first gate element to pass said signal on said interrogation circuit through corresponding said first gate element to a corresponding said match line for reading out corresponding said word.

6. An associative memory system comprising, in combination, an $n$ word associative data memory, an association register for storing an association word, means for comparing said association word coincidently with said $n$ words of associative data memory and deriving match and mismatch indicating signals on $n$ match lines and $n$ mismatch lines, means including said match lines for reading matching words out of said memory, $n$ alternate path cryogenic match-mismatch indicting circuits one corresponding to each of said $n$ words and connected in series across a current source, each operable by a signal on a corresponding said mismatch line for establishing a current in one of said alternate paths indicative of a mismatch between said association word and the corresponding associative data memory word and operable by a signal on the corresponding said match line for establishing a current in the other of said alternate paths indicative of a match condition, an interrogation line, means for cyclically pulsing said interrogation line, $n$ cryotron gate elements series connected in said interrogation line each having as a control winding said other alternate current path of a corresponding match-mismatch circuit each last said cryotron gate element being rendered resistive when said corresponding match-mismatch circuit indicates a match condition, $n$ read out circuits one branching from said interrogation line before each said series connected cryotron gate element, each said branch connecting to a corresponding said match line and including a cryotron gate element having for a control winding said one alternate current path of a corresponding match-mismatch circuit, last said cryotron gate element being rendered resistive when said corresponding match-mismatch circuit indicates a mismatch condition, whereby said interrogation pulse is passed by a said match-mismatch circuit in the mismatch indicating condition to the next succeeding said match-mismatch circuit and said interrogation pulse is passed by a said match-mismatch circuit in the match indicating condition to the corresponding said match line for reading out the corresponding said word.

7. The invention of claim 6 including $n$ alternate path cryogenic read out control circuits one corresponding to each of said $n$ match-mismatch circuits and connected in series, means for applying current to said series connected alternate pathts, $n$ cryotron gate elements, one corresponding to each of said $n$ control circuits disposed in one of last said alternate paths and having for a control winding a corresponding said read out branch whereby last said gate element is rendered resistive when a said interrogation pulse is passed to a corresponding said match line for reading out a corresponding said word thereby diverting last said current to other said alternate path, $n$ cryotron gate elements corresponding to said $n$ gate elements in last said one alternate paths each having for a control winding a corresponding said one alternate path, each last said gate element being superconductive when a corresponding said gate element is rendered resistive by current in a corresponding said branch circuit, first reset circuit means connected in parallel through last said $n$ cryotron gate elements for resetting a match indicating match-mismatch circuit to the mismatch condition after the corresponding said word is read out, $n$ cryotron gate elements one corresponding to each of said $n$ control circuits and disposed in the other of last said alternate paths, second reset circuit means forming a control winding for all of last said $n$ cryotron gate elements for resetting current in said one alternate path after resetting of a corresponding said match-mismatch indicating circuit and means for applying reset pulses sequentially to said first and second reset circuit means after each said interrogation pulse.

8. An interrogation and read out device comprising, in combination, $n$ indicating circuits operable selectively to indicate match condition and mismatch conditions in response to match and mismatch inputs respectively, on $n$ match and $n$ mismatch lines, $n$ control and reset circuits corresponding to said $n$ indicating circuits and having set and reset condition, means for serially interrogating said $n$ indicating circuits and producing outputs successively from those indicating circuits which indicate a match condition, said interrogation being accomplished by $m$ successive interrogation pulses where $m$ is the number of said indicating circuits which indicate a match condition, means operable by a said output for switching a corresponding said control and reset circuit to its set condition, first reset means gated by the set condition of a said control and reset circuit for resetting a corresponding said indicating means to the mismatch condition, second reset means operable for resetting a set control and reset circuit to its reset condition.

9. The invention of claim 8 having means operable by the $m+1$ interrogation pulse for indicating that all matching indicating circuits have been interrogated and reset.

References Cited by the Examiner

UNITED STATES PATENTS 2,973,508 2/1961 Chadurjian ---------- 340—174

OTHER REFERENCES

1959—Publication: IBM 709–7090 Data Processing System. General Information Manual.

Pages 106, 115–118—Kiseda et al., A Magnetic Associative Memory, IBM Journal, April 1961.

ROBERT C. BAILEY, *Primary Examiner.*

MALCOLM A. MORRISON, *Examiner.*